L. SELLING.
Cover for Pitchers, &c.

No. 207,987. Patented Sept. 10, 1878.

Attest:
H. L. Pernie
Floyd Norris

Louis Selling
Inventor:
By Johnson & Johnson
Atty's

UNITED STATES PATENT OFFICE.

LOUIS SELLING, OF DETROIT, MICHIGAN, ASSIGNOR TO JACOB B. SINN, OF SAME PLACE.

IMPROVEMENT IN COVERS FOR PITCHERS, &c.

Specification forming part of Letters Patent No. 207,987, dated September 10, 1878; application filed August 22, 1878.

*To all whom it may concern:*

Be it known that I, LOUIS SELLING, of Detroit, in the county of Wayne and State of Michigan, have invented certain new and useful Improvements in Covers for Pitchers, &c.; and I do hereby declare that the following is a full, clear, and exact description thereof, which will enable others skilled in the art to which it appertains to make and use the same, reference being had to the accompanying drawings, and to letters of reference marked thereon, which form a part of this specification.

Hitherto the covers for glass and earthenware pitchers and liquid-holding vessels have been provided with metallic covers, hinged by metallic devices of various construction.

My object is to use a glass or earthenware cover, hinged to the glass or earthenware vessel, thus not only greatly lessening the expense of the article, but producing a handsome novelty hitherto deemed impracticable. The cover is pivoted to the pitcher or other vessel in a manner to adapt the cover to be lifted and carried back in a horizontal position to uncover the vessel. When carried back, the cover is supported by a rest projecting from the vessel.

Figure 1:
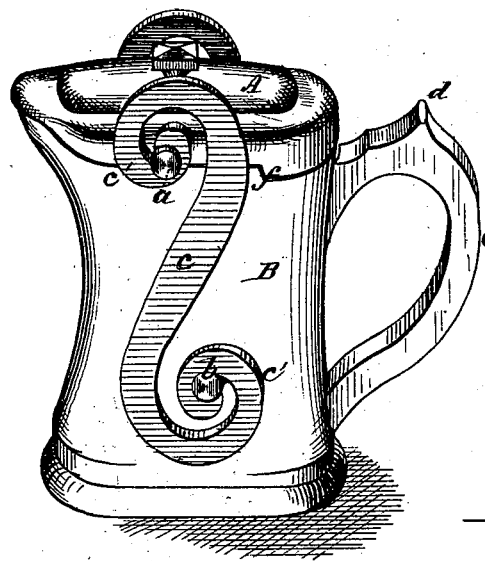
Figure 2:
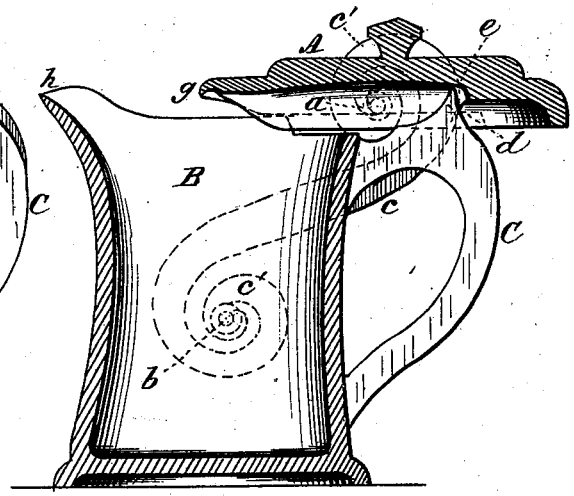
Figure 3:
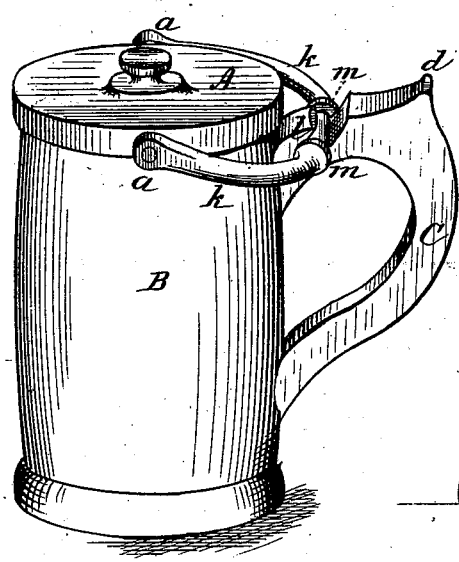

Referring to the drawings, Figure 1 represents a sirup-pitcher with my improved cover; Fig. 2, a section thereof with the cover supported in uncovered position; Fig. 3, a beer glass or mug with a modified connection of my improved cover; and Fig. 4, a section thereof, the cover being supported in uncovered position.

Although I shall hereinafter describe my improvements with reference to glass vessels, I desire it to be particularly understood that my said improvements are applicable not only to all analogous articles of such ware, but to earthenware vessels, china, and all materials used for such purposes—that is, for table dishes and vessels.

When manufactured of glass, the cover A is of a form adapted to the vessel B, and cast with side pivot extensions *a;* so also is the body cast with suitable extensions or bearings *b*, whereby to connect the cover with the body arms or levers *c*, adapted for a movement to carry the cover back in a horizontal position to uncover the vessel. These connecting-levers may be of different form and attached at different points; but whatever these may be, their action is to raise the cover and carry it back and forth in the arc of a circle without changing the horizontal position of the cover.

In Figs. 1 and 2 the connecting arms or levers *c* are of scroll or convoluted form, in order that their ends may be attached to the pivot-bearings of the cover and vessel. In this character of connection it will be noticed that the connecting-pivots of the cover must be in advance of a vertical line from the pivots of the body, as shown in Fig. 1, in order that the cover may be lifted free of the vessel and its contents when being carried back, which, of course, the arc movement will effect. The terminations of the scroll-levers wind around the connecting-pivots *a* and *b*, and their eccentric curves *c'* permit of the lever's attachment and replacement of the parts when broken.

In an uncovered position the cover A is supported upon an extension, *d*, from the handle C or from the vessel, entering a shouldered recess, *e*, in the under side of the cover, so that said shoulder *e* serves as a stop to prevent the forward sliding of the cover when the vessel is turned up, as shown in Fig. 2. The closing movement of the cover is limited by coincident shoulders *f*, Fig. 1, on the cover and vessel. The cover has a downward-projecting lip, *g*, at its front end, which, in connection with an upward-projecting lip, *h*, from the vessel, forms a clearing cut-off to prevent dripping. The cover is rabbeted from the shoulder *g* along its side and front, to allow it to fit within the corresponding top edge of the vessel.

This arrangement is especially well adapted for sirup and gravy vessels; but in beer-mugs and the like this construction would be unnecessary, a pivoted cover according to the principle of my invention being used in such cases. The scroll-lever connections give a sort of sliding action to the cover, and cause the cover to close with a scraping action to clear the mouth.

Figure 4:
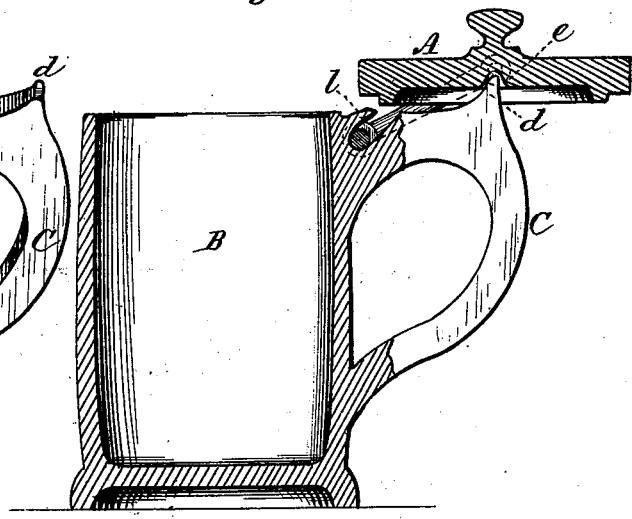

In the beer-mug shown in Figs. 3 and 4 the cover A is connected and moved back and forth upon the same principle as that having the scroll connections; but instead of the scroll-levers the cover is connected by a semicircular carrying-arm, $k$, which, being pivoted at diametrical points $a\ a$, is secured in a slotted bearing, $l$, by shoulders $m$, so as to allow the cover to be raised in the arc of a circle and carried back horizontally upon its holding rest or support. This method of connecting a glass cover allows it to be carried above the contents of the vessel in opening it horizontally.

I claim—

1. A cover or lid for pitchers, glasses, and table vessels connected thereto by means of levers or arms having a pivoted connection with the vessel and with the cover in a manner to adapt the latter to be lifted and carried back in a horizontal position to uncover the vessel.

2. A cover or lid for pitchers, glasses, and table vessels connected thereto by means of arms or levers having a pivoted connection with the vessel and with the cover, in combination with a rest or support for the cover or lid when moved back to uncover the vessel.

3. A cover or lid for pitchers, glasses, and other like vessels connected to the latter by side arms or levers pivoted to the vessel and to the cover or lid in such manner as to allow the back end of said cover to be raised in moving it back to uncover the vessel.

4. A sliding cover or lid having a downward-projecting lip, in combination with a vessel having a raised lip, whereby the cover-lip is adapted to cut off or separate any matters, such as sirup, gravy, or any other like liquid, from the mouth of the vessel, to prevent dripping.

5. The scroll arms or levers detachably connected to the vessel and the cover.

6. A sliding cover carried by pivoted arms or levers, and provided with a stop to limit its forward movement in being closed.

7. A sliding cover carried by pivoted arms or levers, provided with a bottom shoulder or recess, in combination with the projection of the handle or rest, to prevent the cover from closing when not required.

In testimony that I claim the foregoing I have affixed my signature in the presence of two witnesses.

LOUIS SELLING.

Witnesses:
 A. E. H. JOHNSON,
 J. W. HAMILTON JOHNSON,